US006362724B1

(12) United States Patent
Rosenau

(10) Patent No.: US 6,362,724 B1
(45) Date of Patent: Mar. 26, 2002

(54) SECURITY MODULE AND METHOD FOR SECURING COMPUTERIZED POSTAL REGISTERS AGAINST MANIPULATION

(75) Inventor: Dirk Rosenau, Berlin (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 0 days.

(21) Appl. No.: 09/594,003

(22) Filed: Jun. 14, 2000

(30) Foreign Application Priority Data

Jun. 15, 1999 (DE) ........................................ 199 28 057

(51) Int. Cl.[7] ................................................ G06F 7/04
(52) U.S. Cl. ........................................ 340/5.2; 705/401
(58) Field of Search .......................... 340/541, 5.2, 5.4, 340/5.9; 705/401, 400, 30, 60; 713/200; 235/375

(56) References Cited

U.S. PATENT DOCUMENTS

| | | | | | |
|---|---|---|---|---|---|
| 5,027,397 | A | * | 6/1991 | Double et al. | 713/194 |
| 5,719,775 | A | * | 2/1998 | Abumehdi | 705/410 |
| 5,734,571 | A | | 3/1998 | Pilz et al. | 705/400 |
| 5,793,867 | A | * | 8/1998 | Cordery et al. | 705/60 |
| 5,805,711 | A | | 9/1998 | Windel et al. | 380/55 |
| 6,009,417 | A | * | 12/1999 | Brookner et al. | 705/410 |

FOREIGN PATENT DOCUMENTS

| | | |
|---|---|---|
| DE | 42 17 830 | 12/1993 |
| DE | 299 05 219 | 7/1999 |
| DE | 198 16 571 | 10/1999 |
| DE | 198 16 572 | 10/1999 |
| EP | 0 762 338 | 3/1997 |
| EP | 0 805 421 | 5/1997 |
| EP | 0 780 808 | 6/1997 |
| EP | 0 789 333 | 8/1997 |

* cited by examiner

*Primary Examiner*—Thomas Mullen
(74) *Attorney, Agent, or Firm*—Schiff Hardin & Waite

(57) ABSTRACT

In a data security and a security module, first and second data processing units are employed having non-volatile memories for postal register data. At a first point in time at least following letter insertion and following a check of the previously valid accounting data on the basis of an authorization code, the first data processing unit undertakes an advance calculation of the new postal register setting, which is made taking the previously set postage value into consideration, and forms a new authorization code. At a second point in time, the second data processing unit undertakes an accounting with calculation of the new postal register setting, which occurs taking the previously set postage value into consideration. A storage of the pre-calculated, new authorization code and of the new postal register set determined by the second data processing unit in the non-volatile memories subsequently ensue.

15 Claims, 5 Drawing Sheets

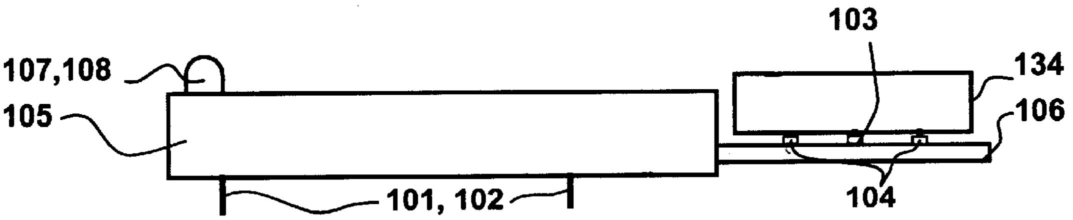

Fig. 3

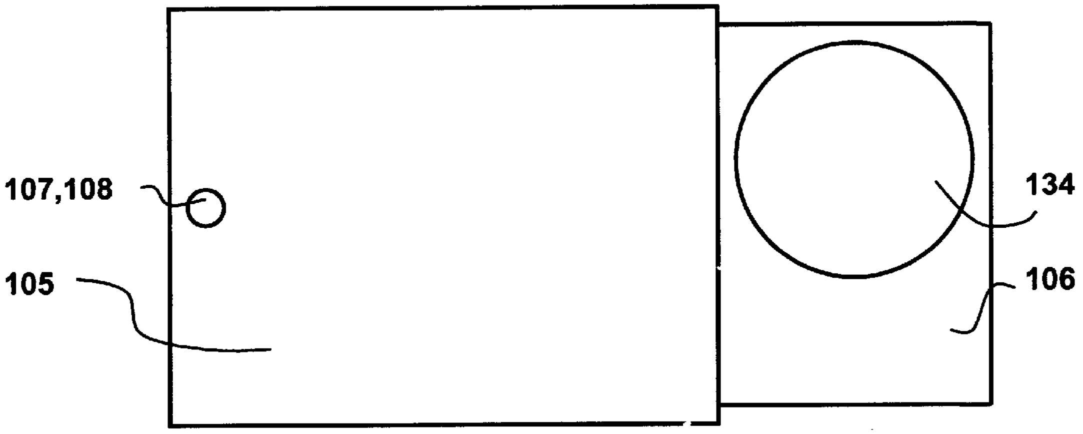

Fig. 4

| Status No. | LEDs | Lit | Blin-king | out | display | Meaning |
|---|---|---|---|---|---|---|
| 220 | R | | | X | Green Lit | OK |
| | G | X | | | | |
| 230 | R | X | | | Red Lit | Error from static test |
| | G | | | X | | |
| 240 | R | X | | | Orange Lit | Error from dynamic test |
| | G | X | | | | |
| 250 | R | | X | | Red Blinking | long time with-out contact with DC |
| | G | | | X | | |
| 260 | R | | | X | Green Blinking | Key is not installed |
| | G | | X | | | |
| 270 | R | | X | | Orange Blinking | Suspect |
| | G | | X | | | |
| 280 | R | X | | | Red Lit Orange blinking | Temperature too high |
| | G | | X | | | |
| 290 | R | | X | | Orange blinking Green Lit | Battery replace-ment needed |
| | G | X | | | | |

Fig. 5

SECURITY MODULE AND METHOD FOR SECURING COMPUTERIZED POSTAL REGISTERS AGAINST MANIPULATION

BACKGROUND OF THE INVENTION

1. Field of the Invention

The present invention is directed to a security module with protection of the postal registers against tampering and to a method for securing postal registers against tampering particularly suited for use in a postage meter machine or a mail processing machine or a computer with mail-processing capability.

2. Description of the Prior Art and Related Subject Matter

A large variety of protection measures are known for protecting against outages or disturbances of intelligent electronic systems.

European Application 417 447 discloses the use of special modules in electronic data processing systems which are equipped with means for protecting against an invasion into their electronics. Such modules are referred to as security modules below.

Modern postage meter machines or other devices for franking postal matter are equipped with a printer for printing the postal value stamp onto the postal matter, a controller for controlling the printing and the peripheral components of the postage meter machine, an accounting unit for debiting postage fees that are maintained in non-volatile memories, and a unit for the cryptographic protection of the postage fee data. A security module (European Application 789 333) can include a hardware accounting unit and/or a unit for securing the printing of the postage fee data. For example, the former can be realized as application specific integrated circuit (ASIC) and the latter can be realized as an OTP (one-time programmable) processor. The internal OTP-ROM stores sensitive data (cryptographic keys) secured against read out that are required, for example, for reloading a credit. An encapsulation with a security housing offers further protection.

Further measures for protecting a security module against an attack on the data stored therein are described in German Applications 198 16 572.2, and 198 16 571.4, as well as co-pending U.S. application Ser. No. 09/522,619 (filed Mar. 10, 2000) and Ser. No. 09/522,620 (filed Mar. 10, 2000) and Ser. No. 09/522,621 (filed Mar. 9, 2000), and German Utility Model application 299 05 219.2. A pluggable security module can assume various states in its life cycle. A distinction can be made as to whether the security module is functioning or malfunctioning. It is assumed that the hardware circuitry of this module is adequately protected against tampering, so this is not separately monitored. Any software-controlled operation is only considered error-free only as long as the original programs, remain intact which must therefore be protected against manipulation.

As is known, a MAC (Message Authentification Code) is utilized for protecting the postal register data in postage meter machines, for example in the Model T1000 sold by Francotyp-Postalia AG & Co. (described in European Application 762 338, and U.S. Pat. No. 5,805,711). In this way, the microprocessor of the security module also can check the validity (freedom from tampering) of the postal registers before an accounting operation. The microprocessor calculates a MAC over the data in the postal registers and compares this MAC to a comparison MAC that was already stored earlier for these postal registers. An accounting subsequently ensues. After this, the microprocessor must re-calculate the comparison MAC for the postal registers that have been modified by the ASIC in order to update it. During the time from the start of the accounting until the write-in of the new comparison MAC, however, the postal registers can be manipulated by a person with memory access without this being recognized by the microprocessor.

SUMMARY OF THE INVENTION

An object of the present invention is to enhance the security o a security module in the accounting procedure.

Such a method and module should, with minimum outlay, enable a maximum protection against a manipulation of the stored data. The method and module should be employable, for example, in postage meter machines for which there are special security demands with respect to the postal register data since, in particular, the monetary accounting data must be incapable of being manipulated.

The inventive method and security module achieve this object by implementing two time-offset accounting operations with different data processing units or computers.

A pre-condition for an advance calculation of a postal register setting is a code that is already present at the beginning, for example an authorization code ($MAC_{old}$) that allows the validity of a previous postal register setting and thus of the preceding accounting data (postal register data), to be checked in a way that is known. Given validity thereof, the first computer undertakes an advance calculation of a postal register setting with the standard postal register data and, if warranted, calculation of an appertaining checksum in a known manner, but without storing the postal register setting in the non-volatile memory for the accounting data. A code is then formed based on the postal register setting calculated in advance. Preferably, a microprocessor of a security module, referred to below as a module processor, is used for this purpose. For example, the code can be a standard message authorization code ($MAC_{new}$) or can exist in some other embodiment such as, for example, Cipher Block Changing (CBC) or Electronic Code Block (ECB) authorization code or a digital signature. Symmetrical as well as asymmetrical encryption algorithms can be utilized. When the module processor, for example before the beginning the advance calculation, has checked the validity of the old postal register setting by calculating a code (MAC) and by comparing this code (MAC) to the stored code ($MAC_{old}$), it calculates the new authorization code ($MAC_{new}$) appertaining to the next accounting operation in advance in the secure memory area before the main accounting, which a second computer implements, is initiated. An application-specific processing unit (ASIC) of the security module is preferably used for this purpose, this including a hardware accounting module and writing the accounting data into the non-volatile memories for the postal register data. Before or at the end of the main accounting, the module processor now also stores the code ($MAC_{new}$) calculated in advance as the current valid code (MAC) in at least one of the non-volatile memories and allocated to the postal register data. Differences compound to known procedures thus are the point in time of the MAC calculation preceding the main accounting, and the source of the MAC calculation, i.e. the module processor, which also calculates the postal register accounting data for the $MAC_{new}$ in advance.

The aforementioned method is repeated when the next accounting ensues. Tampering which occurs during the accounting can be detected with the inventive method due to the checking of both codes (MACs). Since the sources for the respective MAC calculation of the two comparison values are different, the two codes (MACs) to be compared must be identical. Given the assumption that no error occurs in the accounting by the application-specific processing unit (ASIC), it can only be as a result of the tampering if the two codes (MACs) do not coincide.

Another advantage of this method is that two codes (MACs) exist upon turn-on (power on), i.e., one that is valid for the postal registers in case the accounting was not completely ended, and one that is valid for the postal registers if the accounting was ended but the new code (MAC) was not yet capable of being written.

At least one postal register setting thus must exist whose code coincides with one of these two. The latter is the valid, non-manipulated register setting and can be used as a reference. Otherwise, tampering has occurred. The method secures the postal register data with a code at every point in time. Tampering on the basis of a manipulation of the register data at an arbitrary point in time can no longer remain undetected.

These advantages also apply when an asymmetrical encryption algorithm is employed for generating a digital signature. A hash function is first applied to the postal register data, and the data generated in this way are encrypted with a private key to form a digital signature. The advantage of the signature is that public keys, without being kept secret, can be employed for deciphering the signature for the purpose of verifying the postal register data. This allows recovery possibilities given a malfunctioning security module from which the register data are read out via an interface.

The inventive security module, for example for a postage meter machine, performs the function of an accounting, particularly of postage fees, with cryptographic protection and/or additional security functions.

The security module is inventively characterized by having its own indicator that, given direct drive by the module processor of the security module, allows an identification of the current condition of the security module. The module processor implements monitoring and signaling of the module condition and is activated only when the security module is supplied with system voltage, in order to preserve the battery. The module processor monitors the hardware accounting unit, memories and assemblies with respect to further functions. Thus the availability of the system is not the primary consideration but rather the dependable recognition of malfunctions or outages as well as a suitable reaction thereto, as is the case particularly for events which are security-sensitive but somewhat non-critical as to time.

DESCRIPTION OF THE DRAWINGS

FIG. 3 is a side view of the inventive security module.

FIG. 4 is a plan view of the inventive security module.

FIG. 5 is a table for status signaling in accordance with the inventive security module and method.

DESCRIPTION OF THE PREFERRED EMBODIMENTS

Figure 1:
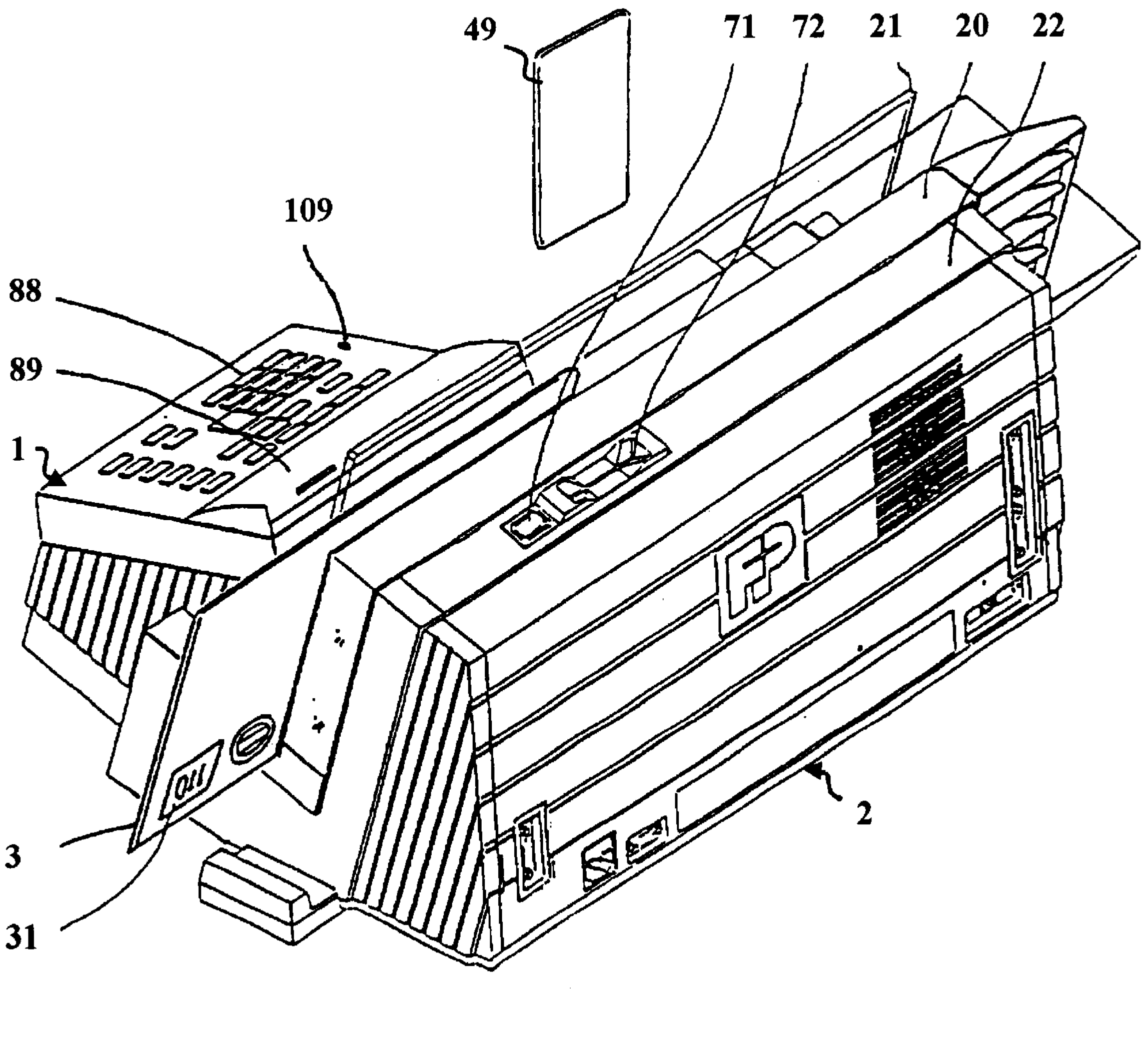
FIG. 1 is a perspective view of a postage meter machine from the back, operable in accordance with the inventive method and in which an inventive security module can be employed.

FIG. 1 shows a perspective view of a postage meter machine from the back. The postage meter machine is composed of a meter 1 and a base 2. The latter is equipped with a chip card write/read unit 60 that is arranged behind a guide plate 20 and that is accessible from the upper side 22 of the housing. After the postage meter machine is turned on by a switch 71, a chip card 49 can be inserted in the slot 72 of the write/read unit 60. A supplied letter 3 standing on edge, which has its side to be printed lying against the guide plate 20, is then printed with a franking stamp 31 according to the input data. The letter feed opening is laterally limited by a transparent plate 21 and the guide plate 20.

The security module is plugged onto the mother board of the meter 1 of the postage meter machine or of some other suitable device. It is preferably accommodated within the meter housing, which is fashioned as a security housing. The meter housing is designed such that the user can see the status display of the security module from the outside through an opening 109. The opening 109 proceeds to surface of the meter 1 at which a keyboard 88 and a display 89 are provided. The display 89 is directly controlled by the internal module processor of the security module and thus cannot be manipulated from the outside without difficulty. The display 89 is always active in the operating condition, so that the application of the system voltage Us+ to the module processor of the security module suffices to activate the display 89 in order to be able to read the module status.

Figure 2:
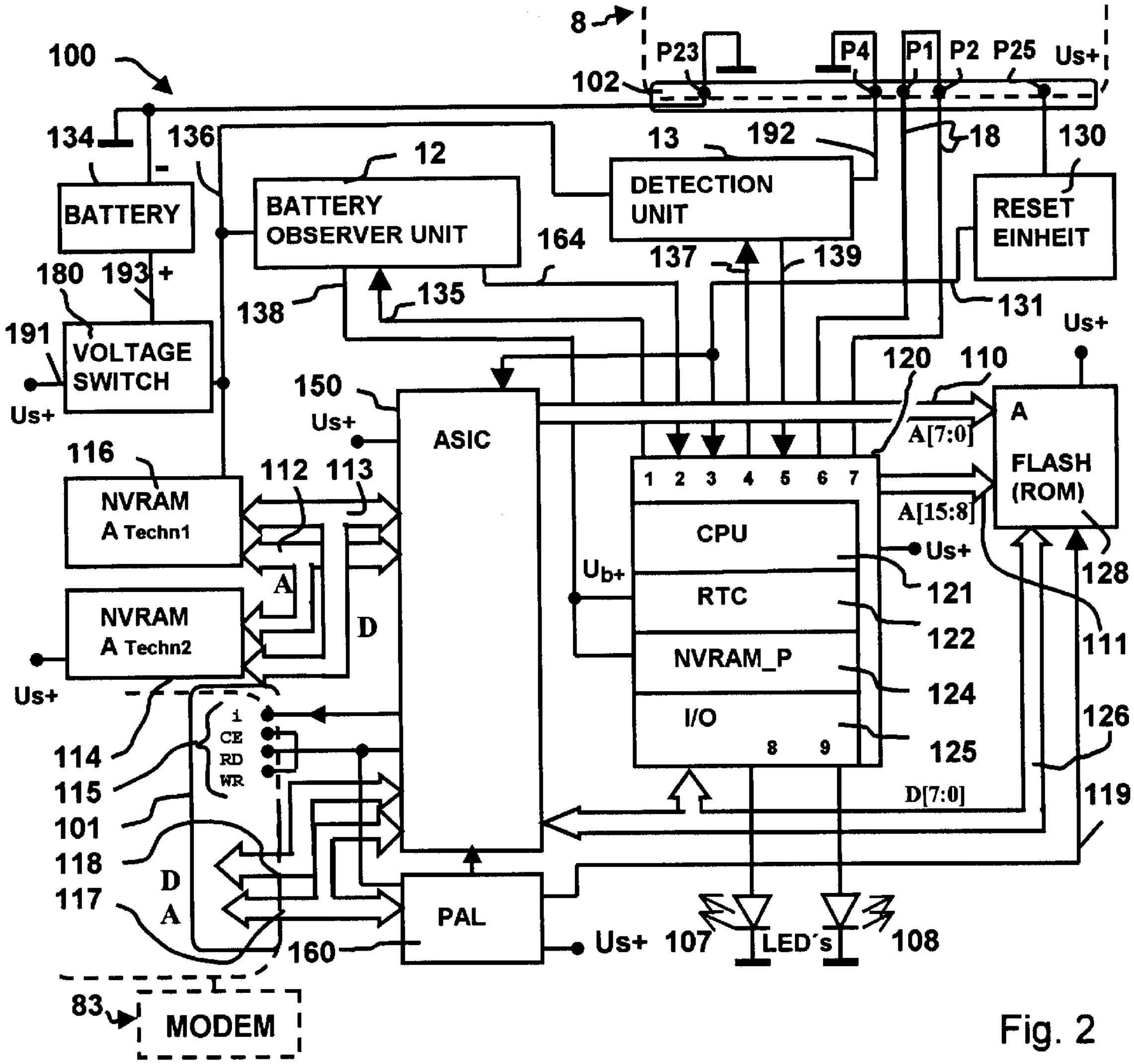
FIG. 2 is a block diagram of a security module in accordance with the invention.

FIG. 2 shows a block diagram of the postal security module PSM 100 in a preferred version. The negative pole of the battery 134 is applied to ground and to a pin P23 of the contact group 102. The positive pole of the battery 134 is connected via the line 193 to one input of a voltage switch over 180, and the line 191 carrying system voltage is connected to the other input of the voltage switch over 180. The type SL-389/P is suitable as battery 134 for a service life of up to 3.5 years or the type SL-386/P is suitable for a service life up to 6 years given a maximum power consumption by the PSM 100. A commercially obtainable circuit of the type ADM 8693ARN can be utilized as the voltage switchover 180. The output of the voltage switchover 180 is supplied via the line 136 to a voltage monitoring unit 12 and a detection unit 13. The voltage monitoring unit 12 and the detection unit 13 have a communication connection to the pins 1, 2, 4 and 5 of the module processor 120 via the lines 135, 164 and 137, 139. The output of the voltage switchover 180 is also supplied via the line 136 to the supply input of a first memory 116, for example a static read-only memory that, due to the battery 134, serves as a non-volatile memory NVRAM of a first technology. The security module PSM is in communication with the postage meter machine via the system bus 115, 117, 118. Via the system bus and a modem (not shown), the module processor 120 can enter into a communication connection with a remote data center. The accounting is accomplished by the application-specific circuit ASIC 150. The first and second non-volatile memories are fashioned with different storage technologies in order to store the postal accounting data therein according to such different storage technologies.

System voltage is also supplied to the supply input of the second non-volatile memory NVRAM 114. This is thereby a non-volatile memory NVRAM of a second technology (shadow-RAM). This second technology preferably is a RAM and an EEPROM, whereby the latter automatically accepts the data contents given an outage of the system voltage. The first NVRAM 116 and the second NVRAM 114 are correspondingly fashioned in order to store the postal accounting data in non-volatile memories of different technologies. The NVRAM 114 of the second technology is connected to the corresponding address and data inputs of the circuit ASIC 150 via an internal address and data buses 112, 113.

The ASIC 150 contains at least one hardware accounting unit for the calculation of the postal data to be stored. An access logic for the ASIC 150 is accommodated in the programmable array logic (PAL) 160. Address and control buses 117, 115 of the mother board of the meter 1 are connected to corresponding pins of the logic PAL 160, and the PAL 160 generates at least one control signal for the ASIC 150 and a control signal 119 for the program memory FLASH 128. The module processor 120 processes a program that is stored in the FLASH 128. The module processor 120 and the other assemblies such as FLASH 128, ASIC 150 and PAL 160 are connected to one another via an internal module system bus that contains lines 110, 111, 126, 119 for data, address and control signals.

The reset unit 130 is connected via the line 131 to the pin 3 of the module processor 120 and to a pin of the ASIC 150. The module processor 120 and the ASIC are reset by a reset signal generated in a reset unit 130 when the supply voltage drops.

The module processor 120 internally has a processing unit CPU 121, a real-time clock (RTC) 122, a RAM unit 124 (designated NVRAM_P) and an input/output unit 125. The module processor 120 of the security module 100 is connected via an internal module data bus 126 to a FLASH 128 and to the ASIC 150. The FLASH 128 serves as a program memory and is supplied with system voltage Us+. For example, it can be a 128 Kbyte FLASH memory of the type AM29F010-45EC. The ASIC 150 of the postal security module 100 supplies the addresses 0 through 7 to the corresponding address inputs of the FLASH via an internal module address bus 110. The module processor 120 of the security module 100 supplies the addresses 8 through 15 to the corresponding address inputs of the FLASH 128 via an internal address bus 111. The ASIC 150 of the security module 100 has a communication connection with the data bus 118, the address bus 117 and the control bus 115 of the mother board of the meter 1 via the contact group 101 of the interface.

As an output voltage on the line 136 for the voltage monitoring unit 12 and memory 116, the voltage switchover 180 supplies that of its input voltages that is higher than the other. Due to the possibility of automatically feeding the described circuit with the higher of the two voltages dependent on the amplitudes of the voltages Us+ and Ub+, the battery 134 can be replaced during normal operation without data loss. The real-time clock 122 and the memory 124 are supplied with an operating voltage via the line 138. This voltage is supplied by the voltage monitoring unit 12 and causes the memory 124 to operate as a non-volatile memory. At least one key for the calculation of an authorization code MAC is stored in the memory 124 in a manner protected against access in order to form the appertaining authorization code MAC over a postal register setting. The latter is required for checking the postal register setting for validity.

In the idle times outside normal operation, the battery 134 of the postage meter machine supplies the real-time clock 122 having date/time-of-day registers and/or the memory 124, which contains security-relevant data, in the aforementioned way. If the voltage of the battery 134 drops below a certain limit during battery operation, then the circuit 12 connects the feed point for the real-time clock 122 and the SRAM 124 to ground. Thus the voltage at the real-time clock 122 and at the SRAM 124 then lies at 0 V. This causes the memory 124, which, for example, contains important cryptographic keys, to be very quickly erased. At the same time, the registers of the real-time clock 122 are also erased and the current time of day and the current date are lost. This action prevents a possible tamperer from stopping the internal real-time clock 122 of the postage meter machine by manipulating the battery voltage without security-relevant data being lost. A tamperer thus is prevented from evading other time-based security measures such as, for example, the sleep mode (as described in European Application 660 268) or long time watchdog (explained below with reference to FIG. 5).

The circuit of the voltage monitoring unit 12 is, for example, dimensioned such that any drop of the battery voltage on the line 136 below the specific threshold of 2.6 V leads to the response of the voltage monitoring unit 12. Simultaneously with the indication of the under-voltage of the battery, the voltage monitoring unit 12 switches into a self-holding state, in which it remains even when the voltage is subsequently increased. The circuit 12 also supplies a status signal. The next time the module is turned on, the module processor 120 can interrogate the status of the circuit (status signal) and can conclude that the battery voltage fell below a specific value in the interim in this way and/or by interpretation of the contents of the erased memory 124. The module processor 120 can reset the monitoring unit 12, i.e. "arm" it. The latter reacts to a control signal on the line 135.

The line 136 at the input of the voltage monitoring unit 12 simultaneously supplies the detection unit 13 with operating or battery voltage. The status of the detection unit 13 is interrogated by the processor 120 via the line 139 or the detection unit 13 is triggered, or set, by the module processor 120 via the line 137. After the setting, a static test for connection is carried out. To that end, ground potential is interrogated via a line 192, this ground potential being present at the terminal P4 of the interface of the postal security module PSM 100 and only being capable of being interrogated when the security module 100 is properly plugged in. When the security module 100 is plugged in, ground potential of the negative pole 104 of the battery 134 of the postal security module PSM 100 is applied to the terminal P23 of the contact group 102 of the interface and thus can be interrogated by the detection unit 13 at the terminal P4 of the interface via the line 192.

Lines that form a conductor loop 18 only, for example, when the security module 100 is plugged into the motherboard of the meter 1, are connected to the pins 6 and 7 of the module processor 120. For dynamically testing as to whether the postal security module PSM 100 is connected to the motherboard of the meter 1, the module processor 120 applies changing signal levels to the pins 6, 7 at very irregular intervals and these are fed back via the loop.

The module processor 120 is equipped with an input/output unit 125 whose pins 8, 9 serve to emit at least one signal for signaling the status of the security module 100. I/O ports of the input/output unit 125 to which internal module indicators, for example colored light-emitting diodes (LED) 107, 108, are connected lie at the pins 8 and 9. The indicator may alternatively be an audio indicator. If LEDs are used, these signal the module status through the opening 109 in the meter housing when a security module 100 is plugged onto the motherboard of the meter 1. The security module can assume various statuses in its life cycle. Thus, for example, whether the security module contains valid cryptographic keys must be detected. Further, it is also important to distinguish whether the security module is functioning or malfunctioning. The exact nature and number of module statuses is dependent on the realized functions in the security module and on their implementation.

FIG. 3 shows the mechanical structure of the security module in a side view. The security module is fashioned as a multi-chip module, i.e. a number of functions units are interconnected on a printed circuit board 106. The security module 100 is potted with a hard casting compound 105, and the battery 134 of the security module 100 is replaceably arranged on the printed circuit board 106 outside the casting compound. For example, it is potted with a casting material 105 so that the LEDs 107, 108 project from the casting material at a first location and such that the printed circuit board 106 with the plugged battery 134 projects laterally from a second location. The printed circuit board 106 also has battery contact posts 103 and 104 for the connection of the poles of the battery 134, preferably on the equipping side above the printed circuit board 106. The contact groups 101 and 102 are arranged under the printed circuit board 106 (interconnect side) of the security module 100 for plugging the postal security module 100 onto the motherboard of the meter 1. In a way that is not shown, the application circuit ASIC 150 has a communication connection with the system bus of a control unit 1 via the first contact group, and the second contact group 102 serves for supplying the security module 100 with system voltage. When the security module is plugged onto the motherboard, then it is preferably arranged within the meter housing that the LEDs 107, 108 are close to the opening 109 or project into it. The meter housing thus is designed such that the user can see the status display of the security module from the outside. The two LEDs 107 and 108 are controlled via two output signals of the I/O ports at the pin 8, 9 of the module processor 120. Both light-emitting diodes 107 and 108 are accommodated in a common component housing (such as a bi-color light-emitting diode), for which reason the dimensions or the diameter of the opening 109 can be relatively small, on the order of magnitude of the LEDs. Three different colors (red, green, orange) can be fundamentally displayed dependent on whether the light-emitting diodes 107 and 108 are driven individually or simultaneously. For distinguishing between statuses, the light-emitting diodes 107 and 108 are also driven to blink individually or together, possibly in alternation, so that nine different statuses can be distinguished wherein at least one of the two LEDs 107 and 108 is activated.

FIG. 4 shows a plan view of the postal security module. The casting compound 105 forms a block surrounding a first part of the printed circuit board 106, whereas a second part of the printed circuit board 106 remains free of casting compound for the replaceably arranged battery 134. Here, the battery contact posts are covered by the battery.

Preferably, the first data processing unit is a module processor 120 and the second data processing unit 150 is an application-specific circuit (ASIC) with a hardware accounting unit. The module processor 120 is programmed for the validity check of postal register data and for the implementation of a static or dynamic self-test. In the validity check, an appertaining authorization code (MAC) is formed over the postal register data stored in the previous accounting and is compared to the authorization code stored in the non-volatile memory 114, 116. Given agreement, the validity of the previous accounting is signaled and the second data processing unit 150 is authorized to implement a further accounting. A signaling ensues given non-coincidence. To that end, the module processor 120 of the security module 100 is programmed to undertake a monitoring and signaling of the module status of the security module 100 via the LEDs 107, 108 connected to the module processor 120 for signaling the module status. A number of possible status displays proceed according to a self-explanatory table for status signaling shown in FIG. 5. The LED 107 emitting green indicates an OK status but a red emitting LED 108 indicates an error status 230 as a result of at least one static self-test. The result of such a known self-test cannot be falsified, due to the direct signaling via the LEDs 107 and 108.

If, for example, the keys stored in the security module were lost in the interim, the ongoing check in the dynamic mode would detect the error and indicate this as the status 240 with the LEDs 107, 108 emitting orange. Booting is required after an on/off operation since no other operation can otherwise be implemented. If the installation of a key was omitted during manufacture, this is indicated as status 260, for example with the LED 107 flashing green. If a long time watchdog timer has timed out, this is signaled as status 250 with the LED 108 flashing red. The long time watchdog timer times out when the data center has not been contacted for a long time, for example in order to reload a credit. The status 250 is likewise reached if the security module was separated from the meter 1. Further status displays for the statuses 270, 280, 290 are optionally provided for various further tests.

Figure 6:
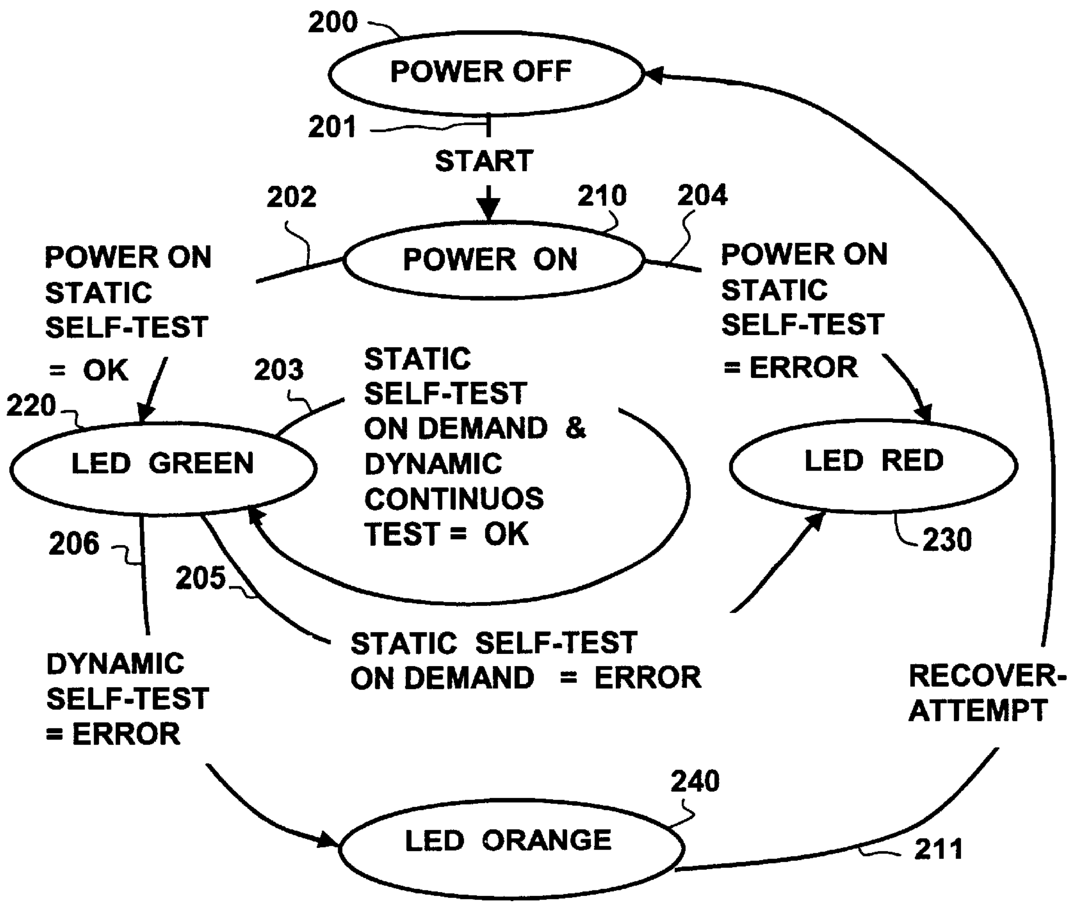
FIG. 6 is a flow chart for the static and dynamic checks which are made in the electronic system in accordance with the inventive method and security module.

FIG. 6 shows an illustration of the tests in the system for statically and dynamically changeable conditions. A system that has been turned off in the status 200 proceeds—after being turned on—via the transition Start 201 into the status 210 in which the security module implements a static self-test as soon as the operating voltage is present. The status 220 (LED 107 emitting green) is reached in the transition 202 wherein the self-test yields an OK given a proper result. Proceeding from this latter status, a repeated static self-test and a dynamic test can be implemented as needed. Such a transition 203 or 206 leads either back to the status 220 LED green given OK or to the status 240 LED orange given an error. The latter can be eliminated by a recover attempt, possibly by shutting off (transition 211) and re-activating the device (transition 201). Static errors, however, cannot be eliminated. From the status 210 wherein the activated device implements a static self-test, there is a transition 204 to the status 230 (LED 108 emitting red) given an error. At any time when the device is in the status 220 (LED 107 emitting green), a static self-test implemented on demand can lead via a transition 205 to the status 230 (LED 108 emitting red) given an error. Proceeding from the status 220 (LED 107 emitting green), further transitions (not shown) lead to the further statuses 270 (signaled with LEDs flashing orange), 280 (signaled with LEDs emitting red/flashing orange), and 290 (signaled with LEDs emitting green/flashing orange).

The security module 100 shown in FIG. 2 is connected to a program memory 128 that contains a program for protecting the postal registers against manipulation, as well as to a first and second data processing units 120, 150, to non-volatile memories 114, 116, to further interconnected function units 12, 13, 130, 160 and 180. All of the aforementioned function units, except the battery 134 (FIGS. 3 and 4), are covered with a casting compound. In the security module

100, the first data processing unit 120 is the module processor. The latter is programmed for the implementation of at least one authorization routine for the postal register data. Authorization of the data in conjunction with the appertaining authorization code MAC in the non-volatile memories 114, 116 signals a module status that allows a further accounting operation to be implemented. The first data processing unit 120 can be programmed for the implementation of additional security routines in combination with further function units 12, 13 connected to one another. A separate security housing that surrounds the casting compound can be eliminated if the meter 1 already has a security housing, i.e. the surrounding security housing is a component of the meter 1. The LEDs 107, 108 project through the casting material 105 in that region of the security module 100 where the surrounding meter housing has the opening 109 for signaling the module status.

The memory 114 and the SRAM 116 shown in FIG. 2 are referred to as NVRAM_A below for simplification. For example, ascending, descending, item count and further data that are to be used for future accounting operations are established in the NVRAM_A at the time $t_i$. The combination of the aforementioned data is also referred to as $P'_{ti}$= postal register set for simplification. The "prime" following the letter P denotes that this postal register setting was calculated by the ASIC 150. Each postal register set is also secured with a code MAC that was calculated by the module processor 120 and that is likewise stored in the NVRAM_A.

The battery-supported, memory 124 of the OTP processor module 120 shown in FIG. 2 is referred to below as NVRAM_P because data non-volatilely stored internally in the OTP cannot be read from the outside. A voltage Ub+ supplied by the battery 134 via the switchover 180 and via the voltage monitoring unit 12 is always available on the line 138 and supplies the internal OTP memory 124, which can thus non-volatilely store data. A postage value that was already entered earlier thus remains stored in non-volatile fashion until it is overwritten. Assume a postage value $p_{ti}$ that can be used for future accounting operations is stored in the NVRAM_A or NVRAM_P at time $t_i$. A calculation $P_{t(i+1)}=F(P'_{t(i-1)}, p_{ti})=P_{new}$ means that a postal register setting was already present at time $t_{i-1}$, this being taken into consideration when a postage value $p_{ti}$ is entered at time $t_i$, and means that the accounting according to the function F was undertaken by the module processor 120 at time $t_{i+1}$. Otherwise, an accounting $P'_{t(i+1)}=F'(P'_{t(i-1)}, p_{ti})$ means that the accounting according to the function F' was undertaken by the hardware accounting unit of the ASIC 150 at time $t_{i+1}$.

The data of the postal register setting from an NVRAM_A can be employed to form a MAC from the postal register setting for authorization checking at an arbitrary point in time $t_i$. When, however, the expression MAC ($P_{ti}$) has no prime after the letter P, then this means that this postal register set and MAC were calculated by the module processor 120 at time $t_i$. As required, the microprocessor can immediately calculate $P_{t(i+1)}$=postal register setting at time $t_{i+1}$ $MAC(P_{t(i+1)})$=MAC from the postal register set at time $t_{i+1}$ in the NVRAM_P.

Figure 7:
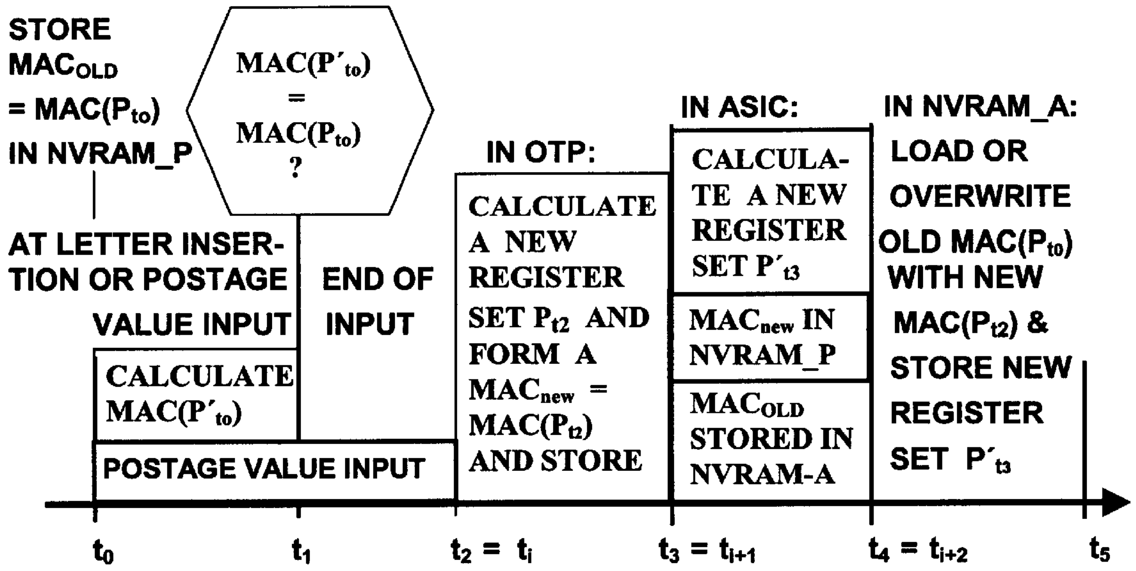
FIG. 7 is an illustration of the executive sequences which take place in an accounting procedure which is secured in accordance with the inventive method and security module.

FIG. 7 shows an illustration of executive sequences in the accounting on the basis of a time line. The input of a new postage value or a letter enclosure forms the starting point $t_0$ for a number of executive sequences. Given application of a letter, the continued employment of a postage value that has already been entered as a new postage value can be assumed.

First, the module processor 120 fetches a $MAC_{old}$ from the NVRAM_A and, defined by the time $t_0$ stores it as $MAC(P_{t0})$ in the NVRAM_P. At the same time, the $P'_{ti}$ register data are processed into a MAC, whereby the result is present no later than time $t_1$ and is likewise intermediately stored in the NVRAM_P. The $MAC(P'_{t0})$ present at time $t_1$ is then compared to the $MAC(P_{t0})$. Given coincidence, no error exists and the module processor 120 waits for the end of the input at time $t_2$. At time $t_2$, the module processor initiates an advance calculation of a new postal register setting $P_{t2}$ and a further formation of a new MAC, whereby the value of the $MAC_{new}$ is stored. The operation is ended by time $t_3$, and a known accounting and formation of a new postal register setting by the ASIC 150 is undertaken. While the postal register setting $P'_{t3}$ is being formed, two MACs are stored, namely $MAC_{old}=MAC(P_{t0})$ and the pre-calculated $MAC_{new}=MAC(P_{t2})$. Before this, the old $MAC_{old}$ is still valid and the previous data that are present stored in the NVRAM_A can be accessed given a voltage outage. The accounting is then completely repeated. At no point, thus, does a falsification opportunity exist for a tamperer. When the postal register setting $P'_{t3}$ has been calculated by the ASIC at time $t_4$, then a deletion or overwriting of the old $MAC(P_{t0})$ with the new $MAC(P_{t2})$ and storage of the new register setting $p'_{t3}$ in the NVRAM_A ensue. This latter operation is ended at time $t_5$.

Figure 8:
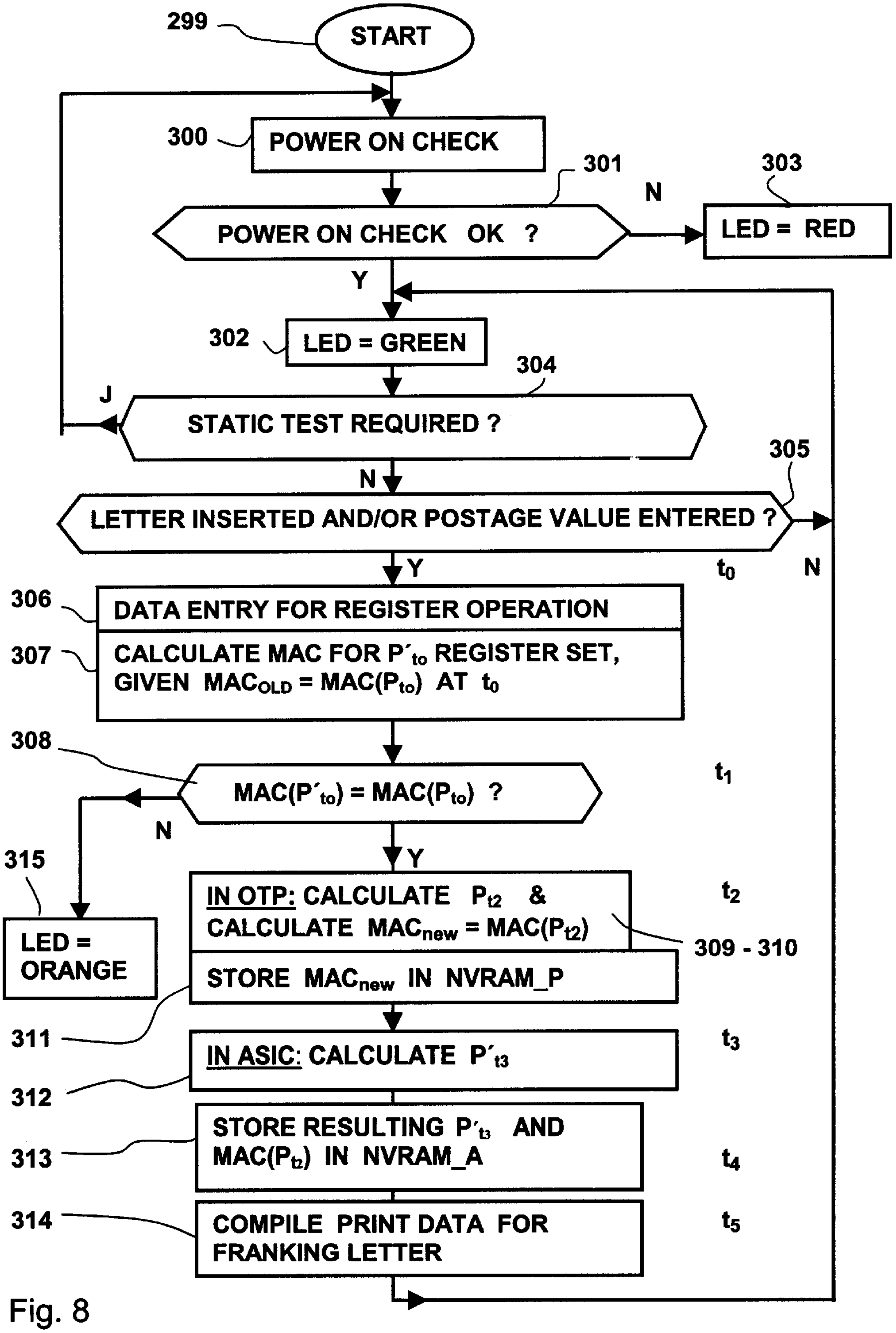
FIG. 8 is a flow chart for a franking routine which takes place in a franking machine operating in accordance with the inventive method and in which the inventive security module is installed.

The tests that sequence in the system before the franking are now explained in greater detail on the basis of the flowchart shown in FIG. 8. As a result of a program stored in the FLASH 128, the microprocessor CPU 121 is programmed to implement such said self-tests, whereby, following the start 299, a power-on self-test is implemented in a first step 300, and a query is then made in step 301 as to whether the power-on self-test yielded an OK. When this is the case, then the microprocessor CPU 121 turns the green LED 107 on via an I/O port 125 in step 302. Otherwise the microprocessor CPU 121 turns the red LED 108 on via an I/O port 125 in step 303. From step 302, a branch is made to the query 304 wherein a check is carried out to see whether a further static test is requested. When this is the case, then a branch is made back to step 300. Otherwise, a branch is made to the query 305 wherein a check is made to determine whether a letter sensor has identified a letter insertion or whether the module processor 120 has recognized an entry of a new postage value. If neither has occurred, then a branch is made back to the step 302, and a waiting loop is executed until a letter insertion or new input has been identified. In the latter instance a branch is made to the step 306 in order to end the entry of the data. At the same time or beginning shortly after time $t_0$, a step 307 is started for the MAC calculation on the basis of the postal register data $P'_{t0}$ available at time $t_0$. A $MAC(P_{t0})$ already formed earlier by the OTP is valid at time $t_0$. The MAC calculation is ended at time $t_1$. The calculated $MAC(P'_{t0})$ is compared in step 308 at time $t_1$ to the old $MAC(P_{t0})$ valid at time $t_0$ (and already formed earlier by the OTP). Given non-coincidence, a branch is made to step 315 in order to drive the LEDs 107, 108 to emit orange. Otherwise, a branch is made to the steps 309, 310. An advance calculation of the new postal register set $P_{t2}$ and, subsequently, a MAC formation, potentially with storing of the $MAC(P_{t2})$ in the NVRAM_P, ensues therein in the OTP 120 at time $t_2$.

When, in step 311, the storage of the $MAC(P_{t2})$ in the NVRAM_P has been ended by the one data processing unit, the other data processing unit, namely a hardware accounting unit (not shown) in the ASIC 150, implements a calculation of the new postal register set at time $t_3$ in step 312.

Storage of the results $P'_{t3}$ and $MAC(P_{t3})$ in the NVRAM_A again ensues in a final step 313. In preparation for a franking, a number of other steps can then be executed including at least a step 314 for editing print data for franking the letter. Subsequently, a branch is made back to step 302.

The step 314 with print data editing for the franking can optionally include a sub-step (not shown) for communicating a generated security code. Although a formation procedure that is basically comparable to the MAC formation is used for generating the security code, the data authorization code DAC is composed of other data and the generation ensues at a different time $t_{i+1}$ from the end of the data input to form a value $DAC(P_{t(i+1)}$, other data). The module processor 120 collaborates with a control processor (not shown) of the meter 1, whereby the latter receives the security code, compiles the print data and communicates the print data to the print head.

By making a branch back to the step 302 after storing the results, a two-stage testing occurs on demand. If an error is discovered in the dynamic test, both the green LED 107 and the red LED 108, are driven by the microprocessor CPU 121 via an I/O port 125 so as to be illuminated. The overall impression that the LEDs 107 and 108 are emitting orange thus arises.

The times $t_0$ through $t_5$ noted on the right half of the flowchart in FIG. 8 are intended to serve as a reference for FIG. 7. Alternative sequences, however, should thereby not be precluded. The advance calculation need not ensue following an authorization check. A new postal register set $P_{ti}$ can just as easily be calculated in advance by the module processor, using a stored postage value $p_t$ that has already been entered. Only after this does the module processor 120 undertake an authorization check with respect to the old postal register setting $P'_{ti-1}$ stored in the memory NVRAM_A, whereby an authorization code $MAC(P'_{t(i-1)})$ is formed by the module processor and compared to an appertaining previous authorization code $MAC_{old}=MAC(P_{t(i-1)})$ stored in the memory NVRAM_A. After the authorization check, the module processor 120 calculates a new authorization code $MAC_{new}=MAC(P_{ti})$ over the new postal register setting $P_{ti}$. The new postal register setting $P_{ti}$ remains stored in the internal OTP NVRAM_P until the MAC calculation. This is important in order to prevent a manipulation during the calculation, particularly when the advance calculation of the new postal register setting $P_{ti}$ and of the new MAC lie apart in time.

The first data processing unit, preferably the module processor 120, can store the following data in the memory NVRAM_P at the first time $t_i$:

$$MAC(P_{ti})=MAC_{new}$$

The second data processing unit, preferably the ASIC 150, implements the accounting with a postage value $p_{ti}$ at a later, second time $t_{i+1}$ according to the accounting function F'. The following ensue:

1. Forming the postal register set $P'_{t(i+1)}=F'(P'_{t(i-1)}, p_{ti})$ with subsequent storing in the memory NVRAM_A.
2. Further, the module processor 120 overwrites the $MAC(P_{ti-1})_{old}$ stored in the NVRAM_A with the $MAC(P_{ti})_{new}$ calculated in advance and stored in the NVRAM_P.
3. Optionally, the module processor 120 communicates an additionally generated security code $DAC(P_{t(i+1)}$, other data) to the third data processing unit (not shown) arranged externally from the security module in the meter for generating the print image.

The procedure is repeated before the next franking. A new postage value $p_{ti+2}$ is entered by time $t_{i+2}$. At time $t_{i+2}$ or later, the absence of tampering with the setting $P'_{t(i+1)}$ can again be checked in that $MAC(P'_{t(i+1)})$ is calculated and compared to the value $MAC(P_{ti})_{old}$ stored in the NVRAM_A. However, generation of an additional security code $MAC(P_{t(i+1)}$, other data) can already be begun, if desired. An advance MAC calculation by the module processor again ensues before the actual accounting operation by the ASIC 150. For example, the module processor calculates a new authorization code at time $t_{i+3}$:

$$MAC_{new}=MAC(P_{t(i+3)})=MAC[F(P'_{t(i+1),\ pt(i+2)})].$$

In a version of the invention the appertaining authorization code $MAC_{new}$ formed due to the new postal register setting that was calculated in advance is stored—after being generated—in an area of the non-volatile memory 114, 116 (NVRAM_A for the postal register data). Alternatively or additionally, the appertaining authorization code $MAC_{new}$ formed due to the new postal register set calculated in advance can be stored—after being generated—in an area of the internal, non-volatile memory 124 (NVRAM_P) of the first data processing unit 120 (module processor).

In a further version, in conjunction with the storage of the new postal register setting $P'_{t(i+1)}$ determined by the second data processing unit 150 (ASIC) and storage of the precalculated, new authorization code $MAC(P_{ti})_{new}$ in the non-volatile memories 114, 116 (NVRAM_A), the latter authorization code is stored in a further area of the internal, non-volatile memory 124 (NVRAM_P) of the first data processing unit 120 (module processor), so that it is redundantly stored for the authorization code belonging to the new postal register setting until the next accounting operation.

It is of no consequence for the implementation of the security measures whether the two data processing units 120, 150 are constructed differently or the same.

Inventively, the security module is intended for use in postal devices, particularly for use in a postage meter machine. However, the security module can also have some other format that makes it possible, for example, for it to be plugged onto the motherboard of a personal computer that, as a PC franker, drives a commercially obtainable printer.

Although modifications and changes may be suggested by those skilled in the art, it is the intention of the inventor to embody within the patent warranted hereon all changes and modifications as reasonably and properly come within the scope of his contribution to the art.

I claim:

1. A security module for securing computerized postal registers against manipulation, comprising:

a first data processing unit containing an internal memory;

a second data processing unit;

a non-volatile memory and a program memory containing a program, each connected to said first data processing unit and to said second data processing unit;

said first data processing unit and said second data processing unit participating in a plurality of accounting operations resulting in postal register data being stored in said non-volatile memory, and said first data processing unit operating according to said program to check validity of postal register data stored in said non-volatile memory from a previous accounting procedure, and to calculate new postal register data in advance of a current accounting procedure if said postal register data stored for said previous accounting procedure are validated, and to form a code dependent on said new postal register data and to store said code in at least one of said non-volatile memory and said internal memory; and said second data processing unit operating according to said program to form postal register data for said current accounting operation and to store said postal register data for said current accounting operation in said non-volatile memory associated with said code.

2. A security module as claimed in claim 1 wherein said first data processing unit forms an MAC over said postal register data calculated in advance, as said code.

3. A security module as claimed in claim 1 wherein said first data processing unit forms a digital signature based on said postal register data calculated in advance, as said code.

4. A security module as claimed in claim 1 wherein said first data processing unit is a processor module and wherein said second data processing unit is an application specific integrated circuit with a hardware accounting unit and wherein said module processor is programmed for conducting said validity check, and for implementing at least one of a static self-test and a dynamic self-test.

5. A security module as claimed in claim 4 wherein said MAC is a first MAC, and wherein for conducting said validity check said processor module forms a second MAC over said postal register data for said previous accounting operation and compares said second MAC to said first MAC and determines said postal register data to be valid given coincidence of said first MAC and said second MAC, and thereupon authorizes said second data processing unit to conduct said current accounting operation, and wherein said processor module emits a humanly perceptible signal if said second MAC does not coincide with said first MAC.

6. A security module as claimed in claim 5 wherein said processor module contains at least one key for calculating said first MAC and said second MAC, said key being protectively stored against access in said internal memory.

7. A security module as claimed in claim 1 wherein at least said first data processing unit is programmed by said program to monitor a status of at least said first data processing unit and to emit a humanly perceptible signal indicative of said status.

8. In a franking apparatus which receives a letter therein having a postage value associated therewith and a postal register for participating in an accounting operation associated with said postage value, a method for securing said postal register against manipulation comprising:

at a first point in time following receipt of said letter in said apparatus, making an advance calculation of a new postal register setting in a first data processing unit, said new postal register setting being dependent on said postage value, and in said first data processing unit also checking validity of postal register data from a previous accounting based on a first authorization code, associated with said postal register data from said previous accounting, and, if said postal register data from said previous accounting are validated forming a second authorization code for said new postal register setting;

at a second point in time, performing a calculation of a new postal register data setting in a second data processing unit dependent on said postage value; and storing the second authorization code in a memory together with the new postal register data setting calculated by said second data processing unit.

9. A method as claimed in claim 8 comprising storing said second authorization code in a protected area of a memory for said postal register data.

10. A method as claimed in claim 8 comprising storing said second authorization code in an internal memory in said first data processing unit.

11. A method as claimed in claim 8 comprising storing said new postal register data setting calculated by said second data processing unit together with said second authorization code in a separate non-volatile memory, and redundantly storing said second authorization code in an internal memory in said first data processing unit until a next accounting operation.

12. A method as claimed in claim 8 wherein said first data processing unit conducts at least one of a static self test and a dynamic self test of said second data processing unit.

13. A method as claimed in claim 8 wherein, for each successive accounting procedure, said first data processing unit overwrites the authorization code calculated in the immediately preceding accounting operation.

14. A method as claimed in claim 8 wherein said first data processing unit generates an additional security code for each accounting operation and communicates said additional security code to a location outside of said first data processing unit.

15. A method as claimed in claim 8 wherein said first data processing unit emits a humanly perceptible signal identifying a status of said first data processing unit.

* * * * *